United States Patent
Kita

(10) Patent No.: US 12,195,174 B2
(45) Date of Patent: Jan. 14, 2025

(54) VERTICAL TAKEOFF AND LANDING AIRCRAFT

(71) Applicant: SUBARU CORPORATION, Tokyo (JP)

(72) Inventor: Kouichi Kita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 59 days.

(21) Appl. No.: 17/792,888

(22) PCT Filed: Jan. 19, 2021

(86) PCT No.: PCT/JP2021/001700
§ 371 (c)(1),
(2) Date: Jul. 14, 2022

(87) PCT Pub. No.: WO2021/157343
PCT Pub. Date: Aug. 12, 2021

(65) Prior Publication Data
US 2023/0054385 A1    Feb. 23, 2023

(30) Foreign Application Priority Data
Feb. 4, 2020 (JP) ................... 2020-016677

(51) Int. Cl.
*B64C 27/28* (2006.01)
*B64C 27/08* (2023.01)
*B64C 27/26* (2006.01)

(52) U.S. Cl.
CPC .............. *B64C 27/28* (2013.01); *B64C 27/08* (2013.01); *B64C 27/26* (2013.01)

(58) Field of Classification Search
CPC ......... B64C 27/28; B64C 27/08; B64C 27/26; B64C 27/20; B64C 1/28; B64C 11/001; B64U 30/297; B64U 30/299
See application file for complete search history.

(56) References Cited

U.S. PATENT DOCUMENTS

| | | | |
|---|---|---|---|
| 10,011,351 B2 * | 7/2018 | McCullough | G08G 5/0065 |
| 10,737,797 B2 * | 8/2020 | Murrow | B64D 27/24 |

(Continued)

FOREIGN PATENT DOCUMENTS

| | | |
|---|---|---|
| JP | 2014-113937 A | 6/2014 |
| JP | 2016-501773 A | 1/2016 |

(Continued)

OTHER PUBLICATIONS

Japanese Notice of Reasons for Refusal issued in corresponding Japanese Patent Application No. 2020-016677, dated Oct. 10, 2023, with English translation.
International Preliminary Report on Patentability issued in corresponding International Patent Application No. PCT/JP2021/001700, dated Jul. 28, 2022, with English translation.

(Continued)

*Primary Examiner* — Valentina Xavier
(74) *Attorney, Agent, or Firm* — Rimon P.C.

(57) ABSTRACT

A vertical takeoff and landing aircraft is capable of vertical takeoff and landing and horizontal flight, and includes a cabin, rotors, protectors, a connector and a hinge. The cabin is capable of carrying a crew and/or a cargo. The rotors are positioned in front of and behind the cabin during the vertical takeoff and landing. The protectors surround the rotors. The connector connects the protectors to one another. The hinge attaches the connector to the cabin such that the connector is rotatable with respect to the cabin. The vertical takeoff and landing aircraft performs the vertical takeoff and landing and the horizontal flight by the connector rotating with respect to the cabin and accordingly the rotors and fixed wings rotating around the cabin.

6 Claims, 3 Drawing Sheets

(56) References Cited

U.S. PATENT DOCUMENTS

| | | | |
|---|---|---|---|
| 11,548,621 B1* | 1/2023 | Robinson | B64C 3/32 |
| 11,597,509 B1* | 3/2023 | Alfaro | B64C 29/0025 |
| 2011/0042509 A1 | 2/2011 | Bevirt et al. | |
| 2014/0124613 A1 | 5/2014 | Yang | |
| 2015/0314865 A1 | 11/2015 | Bermond et al. | |
| 2018/0002011 A1 | 1/2018 | McCullough et al. | |
| 2018/0044011 A1 | 2/2018 | Reichert | |
| 2020/0115045 A1* | 4/2020 | Mermoz | B64D 27/24 |
| 2020/0164975 A1* | 5/2020 | Robertson | B64C 27/52 |
| 2022/0194575 A1* | 6/2022 | Duffy | B64C 21/02 |

FOREIGN PATENT DOCUMENTS

| | | |
|---|---|---|
| JP | 2019-182174 A | 10/2019 |
| WO | 2019/116101 A1 | 6/2019 |

OTHER PUBLICATIONS

English Translation of the Written Opinion of the International Searching Authority issued in corresponding International Patent Application No. PCT/JP2021/001700, dated Jul. 28, 2022.
International Search Report issued in corresponding International Patent Application No. PCT/JP2021/001700, dated Mar. 2, 2021, with English translation.
Extended European Search Report issued in corresponding EP Application No. 21750259.0, dated Dec. 20, 2023.
Corrected European Search Opinion issued in corresponding EP Application No. 21750259.0, dated Jan. 17, 2024.
Notice of Reasons of Refusal issued in corresponding Japanese Application No. 2020-016677 dated Feb. 20, 2024, w/ English Translation.

* cited by examiner

VERTICAL TAKEOFF AND LANDING AIRCRAFT

CROSS REFERENCE TO RELATED APPLICATIONS

This application is the U.S. National Phase under 35 U.S.C. § 371 of International Application No. PCT/JP2021/001700, filed on Jan. 19, 2021, which claims the benefit of Japanese Application No. 2020-016677, filed on Feb. 4, 2020, the entire contents of each are hereby incorporated by reference.

TECHNICAL FIELD

The present invention relates to a vertical takeoff and landing aircraft.

BACKGROUND ART

Vertical takeoff and landing aircrafts come in a variety of forms. In order to achieve both vertical takeoff and landing and high-speed horizontal flight, there are, for example, a system (1) of providing propulsion devices separately for vertical takeoff and landing and for horizontal flight, a system (2) of changing the angle of a propulsion device (e.g., Patent Literature 1), and a system (3) of changing, like a tail-sitter, the tilt of a fuselage itself.

CITATION LIST

Patent Literatures

Patent Literature 1: JP 2016-501773 A

SUMMARY OF INVENTION

Technical Problem

However, the system (1) is disadvantageous in terms of weight and cost because propulsion devices are provided separately for vertical takeoff and landing and for horizontal flight. Further, the system (2) is disadvantageous in terms of weight, cost and reliability because a mechanism and/or control to change the angle of the propulsion device is complex. Still further, the system (3) is not always good in terms of comfort of a crew who gets in the fuselage and carrying of cargo that is loaded in the fuselage because the attitude of the fuselage itself greatly changes.

The present invention has been conceived in view of the above points, and objects thereof include providing a vertical takeoff and landing aircraft that is capable of both vertical takeoff and landing and high-speed horizontal flight while keeping a crew, cargo and/or the like horizontal, and can achieve weight reduction, low cost and improvement of reliability.

Solution to Problem

In order to solve the abovementioned problem(s), the present invention stated in claim 1 is a vertical takeoff and landing aircraft capable of vertical takeoff and landing and horizontal flight, including:
a cabin capable of carrying a crew and/or a cargo;
rotors positioned in front of and behind the cabin during the vertical takeoff and landing;
protectors that surround the rotors;
a connector that connects the protectors to one another; and
a hinge that attaches the connector to the cabin such that the connector is rotatable with respect to the cabin,
wherein the vertical takeoff and landing aircraft performs the vertical takeoff and landing and the horizontal flight by the connector rotating with respect to the cabin and accordingly the rotors and fixed wings rotating around the cabin.

The present invention stated in claim 2 is the vertical takeoff and landing aircraft according to claim 1, wherein parts of the protectors function as the fixed wings.

The present invention stated in claim 3 is the vertical takeoff and landing aircraft according to claim 1 or 2, wherein as the hinge, a damper hinge is used, the damper hinge providing a greater resistance against the rotation of the connector as an angular velocity of the connector with respect to the cabin is greater.

The present invention stated in claim 4 is the vertical takeoff and landing aircraft according to any one of claims 1 to 3, wherein the vertical takeoff and landing aircraft is configured to obtain a lift during the vertical takeoff and landing by the rotation of the rotors and obtain the lift during the horizontal flight by the fixed wings.

The present invention stated in claim 5 is the vertical takeoff and landing aircraft according to any one of claims 1 to 4, wherein the protectors are configured such that parts of each of the protectors being a lower side and an upper side during the horizontal flight function as the fixed wings.

The present invention stated in claim 6 is the vertical takeoff and landing aircraft according to any one of claims 1 to 5, wherein the hinge is provided at a position higher than a center of gravity of the cabin.

Advantageous Effects of Invention

According to the present invention, a vertical takeoff and landing aircraft is capable of both vertical takeoff and landing and high-speed horizontal flight while keeping a crew, cargo and/or the like horizontal, and can achieve weight reduction, low cost and improvement of reliability.

DESCRIPTION OF EMBODIMENTS

Hereinafter, an embodiment(s) of a vertical takeoff and landing aircraft according to the present invention will be described.

The vertical takeoff and landing aircraft of this embodiment is capable of vertical takeoff and landing and horizontal flight.

Figure 1A:
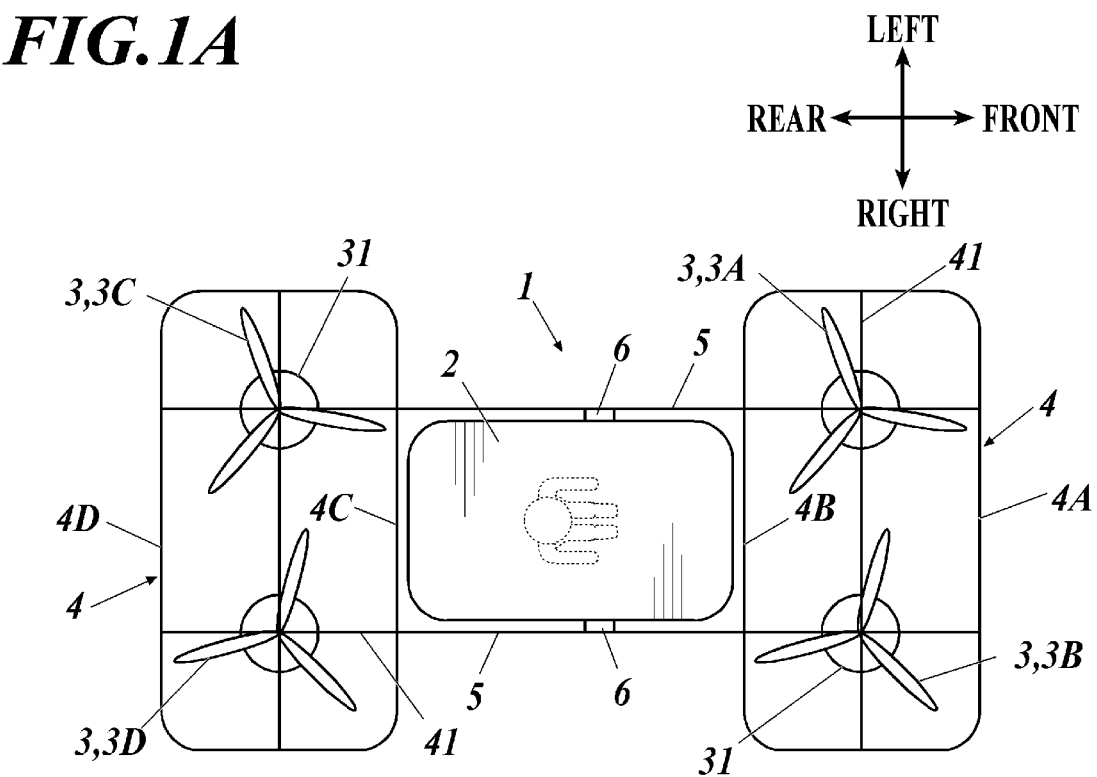
FIG. 1A is a plan view showing the configuration of a vertical takeoff and landing aircraft of an embodiment(s) during vertical takeoff and landing.
Figure 1B:
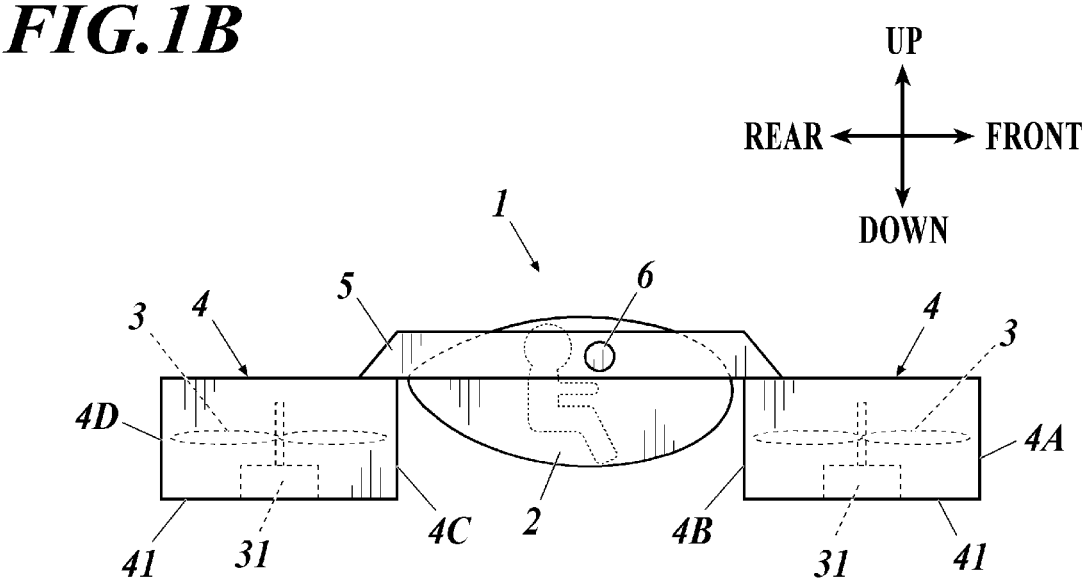
FIG. 1B is a side view showing the configuration of the vertical takeoff and landing aircraft of the embodiment during vertical takeoff and landing.

First, the configuration of the vertical takeoff and landing aircraft during vertical takeoff and landing will be described with reference to the drawings. FIG. 1A is a plan view showing the configuration of the vertical takeoff and landing aircraft of this embodiment during vertical takeoff and landing. FIG. 1B is a side view thereof.

A vertical takeoff and landing aircraft 1 mainly includes a fuselage 2, (sets of) rotors 3, protectors 4, connectors 5, and hinges 6.

The cabin 2 is a housing in which a crew can get and/or cargo can be loaded. In this embodiment, the cabin 2 as a whole is formed to have a streamlined external shape.

Although FIG. 1A and FIG. 1B show the cabin 2 in which only one crew member gets, the cabin 2 may be configured as a cabin for a plurality of crew members to get in or as an unmanned or manned cabin to load and transport cargo.

In front of and behind the cabin 2, the rotors 3 are arranged. In this embodiment, the rotors 3 are provided at two places on the front side and two places on the rear side, four places in total, so as to face in the upward/downward direction.

The rotors 3 are driven by motors 31 to rotate. In this embodiment, in relation to the moment or the like that is applied to the fuselage, the rotors 3 on the front side rotate in opposite directions to one another, and the rotors 3 on the rear side rotate in opposite directions to one another. That is, in FIG. 1A, for example, the left-front rotors 3A and the right-rear rotors 3D rotate clockwise, and the right-front rotors 3B and the left-rear rotors 3C rotate counterclockwise.

The protectors 4 are provided, one that surrounds and protects the rotors 3 at two places on the front side and the other that surrounds and protects the rotors 3 at two places on the rear side.

In this embodiment, parts of the protectors 4 function as fixed wings 4A to 4D, which will be described later.

In this embodiment, the abovementioned motors 31 are attached to fixing members 41 that are provided at the lower end parts of the protectors 4, so that the rotors 3 are fixed to the protectors 4.

The protectors 4 are opened in their upper sides and lower sides, and during vertical takeoff and landing, by rotation of the rotors 3, air above the protectors 4 are drawn into the protectors 4 and ejected from the protectors 4 downward as downward airflow.

On the left side and the right side of the cabin 2, two connectors 5 are arranged parallel to one another so as to extend in the front-rear direction.

To the front ends and the rear ends of the connectors 5, the protectors 4 are attached, so that the front protector 4 and the rear protector 4 are connected to one another by the connectors 5.

The connectors 5 are attached to the left side and the right side of the cabin 2 via the hinges 6 such that the connectors 5 are rotatable with respect to the cabin 2.

Figure 3:
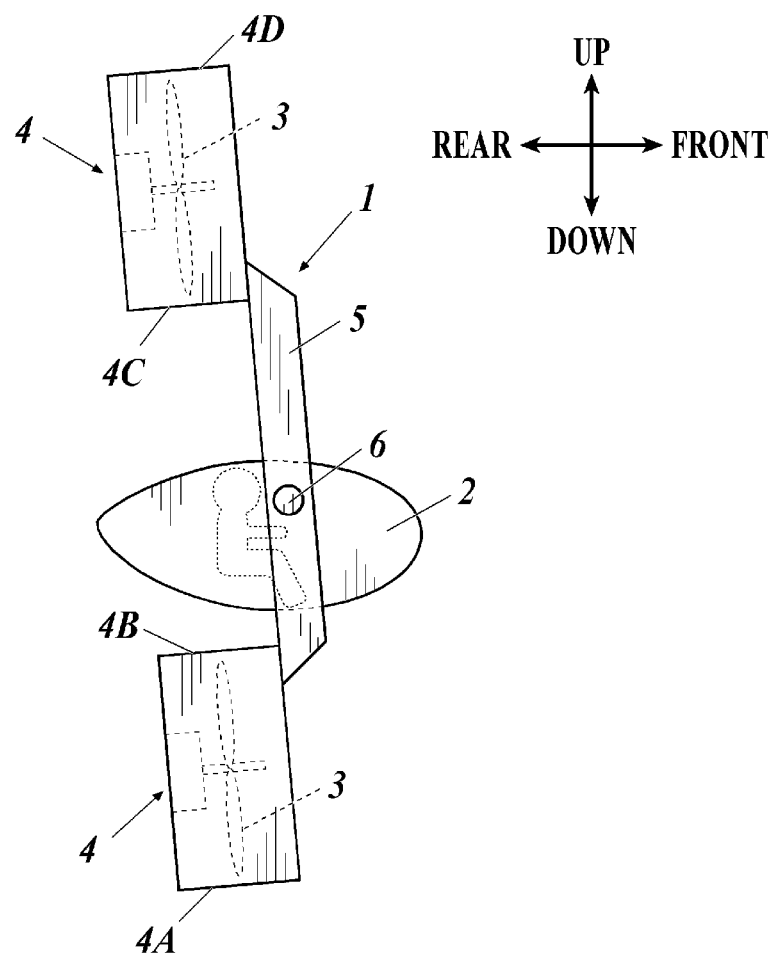
FIG. 3 is a side view showing the configuration of the vertical takeoff and landing aircraft of the embodiment during horizontal flight.

In this embodiment, the connectors 5 are thus attached to the cabin 2 via the hinges 6. Hence, as will be described later, even when the connectors 5 tilt from the state of extending in the horizontal direction (front-rear direction) and rotate such that the rear sides of the connectors 5 go up, the cabin 2 does not tilt from the state of facing in the front/rear direction shown in FIG. 1B. This is shown in FIG. 3 and will be described later.

In this embodiment, as the hinges 6, damper hinges are used. The damper hinges provide greater resistance against rotation of the connectors 5 as the angular velocity of the connectors 5 with respect to the cabin 2 is greater.

That is, when the connectors 5 rotate slowly with respect to the cabin 2, the connectors 5 rotate with little resistance from the hinges 6 (damper hinges), whereas when the connectors 5 rotate rapidly with respect to the cabin 2, the connectors 5 rotate with resistance from the hinges 6 (damper hinges).

If the hinges 6 do not have the damper function, namely, if, unlike this embodiment, the hinges 6 are not damper hinges, when the connectors 5 rotate rapidly with respect to the cabin 2, the cabin 2 may swing back and forth, namely, perform pendulum motion, during and after the rapid rotation of the connectors 5, whereas if, like this embodiment, damper hinges are used as the hinges 6, even when the connectors 5 rotate rapidly, the hinges 6 resist the swing of the cabin 2 and can accurately prevent or reduce the back-and-forth swing of the cabin 2.

Figure 2:
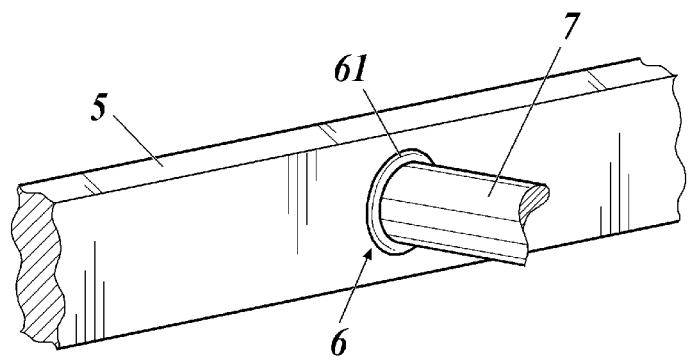
FIG. 2 shows a configuration example in which a hinge is configured by a damper hinge.

In this embodiment, the hinges 6 (damper hinges) are each provided at an attachment part of an attachment 7 to the connector 5, the attachment 7 being attached to the cabin 2, which is not shown in FIG. 2. Between the connector 5 and the attachment 7, a friction material 61 may be interposed as shown in FIG. 2.

Instead of or in addition to the friction materials 61, oil may be interposed.

Although not shown, dampers may be provided separately from the hinges 6. In this case, for example, the connectors 5 are attached to the attachments 7 by the hinges 6 so as to rotate with no resistance, and the dampers function to provide resistance against rotation of the connectors 5.

In this embodiment, the hinges 6 are provided at positions higher than the center of gravity of the cabin 2. This configuration makes the cabin 2 kind of hang from the hinges 6.

If the hinges 6 are provided at positions lower than the center of gravity of the cabin 2, the cabin 2 is likely to rotate by falling forward or backward centering on the hinges 6 by its own weight, which decreases stability.

As in this embodiment, if the hinges 6 are provided at positions higher than the center of gravity of the cabin 2, the cabin 2 hangs from the hinges 6 as described above, and hence does not rotate with respect to the hinges 6, which maintains stability of the cabin 2.

In the above case, if the hinges 6 are configured by damper hinges (or separate dampers from the hinges 6 are provided), the back-and-forth swing of the cabin 2 with respect to the hinges 6 is also prevented or reduced, which maintains stability of the cabin 2 more certainly.

The same applies to when the connectors 5 rotate with respect to the cabin 2. That is, even when the connectors 5 rotate with respect to the cabin 2, the cabin 2 keeps hanging from the hinges 6 and stably keeps facing (being oriented) in a substantially horizontal direction.

In this embodiment, the hinges 6 are provided slightly forward of the center of gravity of the cabin 2. This is for the cabin 2 to keep the attitude to face in the substantially horizontal direction in balance with the crew and/or cargo in the cabin 2. The positions of the hinges 6 in the front-rear direction are determined as appropriate in accordance with the arrangement of the crew and/or cargo in the cabin 2.

Next, the configuration of the vertical takeoff and landing aircraft 1 during horizontal flight will be described, and also effects of the vertical takeoff and landing aircraft 1 of this embodiment, structures of the fixed wings 4A to 4D, and so forth will be described.

FIG. 3 is a side view showing the configuration of the vertical takeoff and landing aircraft of this embodiment during horizontal flight.

When the rotors 3 are rotated in the state of vertical takeoff and landing shown in FIG. 1A and FIG. 1B, the vertical takeoff and landing aircraft 1 ascends in a substantially vertical direction.

Thus, the vertical takeoff and landing aircraft 1 of this embodiment obtains lift by rotation of the rotors 3 during vertical takeoff and landing.

Then, in the sky, by increasing the lift of the rear rotors 3, for example, by increasing the rate of rotation of the rear rotors 3 to be higher than that of the front rotors 3, and optionally reducing the lift of the front rotors 3 at the same time, the connectors 5 rotate such that the rear sides of the connectors 5 go up while the cabin 2 keeps facing in the substantially horizontal direction, and as shown in FIG. 3, tilt to the state of being nearly vertical.

As a result, the rotors 3 and the protectors 4 at both ends of the connectors 5 are positioned above and below the cabin 2.

In this state, rotation of the rotors 3 contributes little to the lift of the vertical takeoff and landing aircraft 1, but generates airflow behind the vertical takeoff and landing aircraft 1. Accordingly, the vertical takeoff and landing aircraft 1 obtains forward thrust for horizontal flight by rotation of the rotors 3.

In this embodiment, as described above, parts of the protectors 4 function as the fixed wings 4A to 4D, and the vertical takeoff and landing aircraft 1 obtains the lift during horizontal flight by the fixed wings 4A to 4D.

Thus, the vertical takeoff and landing aircraft 1 of this embodiment can perform vertical takeoff and landing and horizontal flight by the connectors 5 rotating with respect to the cabin 2 and accordingly the rotors 3 and the fixed wings 4A to 4D rotating around the cabin 2.

In this embodiment, as described above, the protectors 4 are formed at the both end parts of the connectors 5 so as to surround the rotors 3, and configured such that during horizontal flight (FIG. 3), the lower parts 4A, 4C and the upper parts 4B, 4D of the protectors 4, which are during vertical takeoff and landing (FIG. 1A and FIG. 1B), the front parts 4A, 4C and the rear parts 4B, 4D of the protectors 4, function as the fixed wings 4A to 4D.

Figure 4:
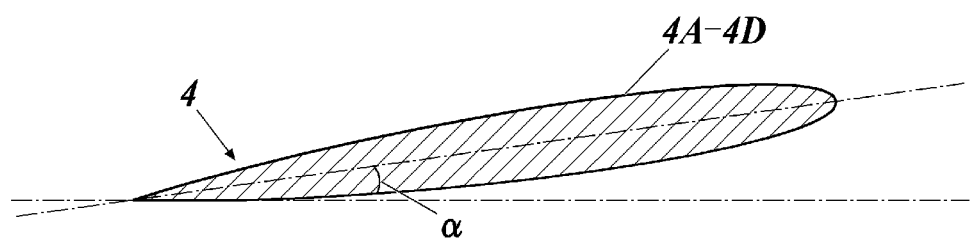
FIG. 4 is a cross-section view showing an example of a fixed wing formed to have a cross-section shape of being perfectly symmetrical about the centerline.

Although the fixed wings 4A to 4D can each be formed, for example, to have a cross-section shape of the upper surface bulging more than the lower surface, which is a shape often used for wings of airplanes, they each may be formed, as shown in FIG. 4, to have a cross-section shape of being perfectly symmetrical about the centerline.

Even if the cross-section shape of each of the fixed wings 4A to 4D is perfectly symmetrical, sufficient lift can be obtained as far as the angle of attack a is appropriate.

The rotors 3 (their rates of rotation or the like) of the vertical takeoff and landing aircraft 1 are controlled basically in the same manner as those of a quadcopter having the same number of (sets of) rotors as the number of (sets of) rotors 3 of the vertical takeoff and landing aircraft 1. However, in the case of a quadcopter, when rotors tilt to the extent that they face in the substantial horizontal direction, the lift cannot be obtained from rotation of the rotors, and accordingly possibility of crashes increases. Hence, the rotors cannot be tilted greatly.

In this regard, in this embodiment, during horizontal flight, the lift is obtained from the fixed wings 4A to 4D. Hence, as shown in FIG. 3, the rotors 3 (connectors 5) can be tilted to the extent that they face in the substantially horizontal direction, and rotation of the rotors 3 can be used as the thrust, which enables high-speed flight.

As described above, according to the vertical takeoff and landing aircraft 1 of this embodiment, the connectors 5 are attached to the left side and the right side of the cabin 2, which is capable of carrying a crew and/or cargo, via the hinges 6 such that the connectors 5 are rotatable with respect to the cabin 2, and the rotors 3 are arranged in the protectors 4 that are attached to the both ends of the connectors 5 (front end and rear end of each of the connectors 5 during vertical takeoff and landing). Further, parts of the protectors 4 function as the fixed wings 4A to 4D. The vertical takeoff and landing aircraft 1 is configured to perform vertical takeoff and landing by obtaining lift by rotation of the rotors 3 and perform horizontal flight by obtaining lift by the fixed wings 4A to 4D and thrust by rotation of the rotors 3, by the connectors 5 rotating with respect to the cabin 2.

Thus, the vertical takeoff and landing aircraft 1 of this embodiment uses the rotors 3 as a vertical propulsion device during vertical takeoff and landing and as a forward propulsion device during horizontal flight.

This can curb increase in weight and cost as compared with a case where propulsion devices are provided separately for vertical takeoff and landing and for horizontal flight.

Further, the vertical takeoff and landing aircraft 1 of this embodiment does not require any mechanism or control to change the angle of the rotors 3, which are of the propulsion devices, namely, to change the state of the rotors 3 from the state of facing upward during vertical takeoff and landing to the state of facing sideways during horizontal flight. The angle of the rotors 3 can be changed by only increasing the rate of rotation (lift) of the rotors 3 positioned on the rear side during vertical takeoff and landing to be higher than the rate of rotation (lift) of the rotors 3 positioned on the front side during vertical takeoff and landing.

No requirement of the mechanism or control to change the angle of the rotors 3 can curb increase in weight and cost. No requirement of such a mechanism means that there is no mechanism that could be a cause of trouble. Hence, the vertical takeoff and landing aircraft 1 of this embodiment is also superior in terms of reliability.

Further, even when the connectors 5 tilt from the state of extending in the horizontal direction (front-rear direction) and rotate such that the rear sides of the connectors 5 go up, namely, even when the rotors 3 and the fixed wings 4A to 4D change their state from the state of being positioned in front of and behind the cabin 2 to the state of being positioned above and below the cabin 2, the cabin 2 does not tilt accordingly and keeps facing in the horizontal direction.

Hence, as compared with a case, such as a case of a general tail-sitter, where the attitude changes to tilt according to the tilt of the rotors 3 or the like, the vertical takeoff and landing aircraft 1 of this embodiment can fly while keeping a crew who boards the aircraft 1, cargo that is loaded in the cabin 2 and/or the like horizontal, and hence is excellent in terms of comfort of the crew who boards the aircraft 1, stability of carrying of the cargo that is loaded into the cabin 2, and so forth.

Thus, the vertical takeoff and landing aircraft 1 of this embodiment is capable of both vertical takeoff and landing and high-speed horizontal flight while keeping a crew, cargo and/or the like horizontal.

Also, it can achieve weight reduction, low cost and improvement of reliability.

Although one or more embodiments of the present invention have been described above, it goes without saying that the present invention is not limited to the above embodiments or the like but can be appropriately modified without departing from the scope of the present invention.

For example, in the above embodiment(s), parts of the protectors 4 function as the fixed wings 4A to 4D, but, instead of parts of the protectors 4 functioning as the fixed wings 4A to 4D, fixed wings may be provided separately from the protectors 4.

INDUSTRIAL APPLICABILITY

The present invention is applicable to a vertical takeoff and landing aircraft.

REFERENCE SIGNS LIST

1 Vertical Takeoff and Landing Aircraft
2 Cabin
3 Rotor
4 Protector
4A to 4D Fixed Wing
5 Connector
6 Hinge

The invention claimed is:

1. A vertical takeoff and landing aircraft capable of vertical takeoff and landing and horizontal flight, comprising:
　a cabin capable of carrying a crew and/or a cargo;
　rotors positioned in front of and behind the cabin during the vertical takeoff and landing;
　protectors that surround the rotors;
　a connector that connects the protectors to one another; and
　a hinge that attaches the connector to the cabin such that the connector is rotatable with respect to the cabin,
　wherein the vertical takeoff and landing aircraft performs the vertical takeoff and landing and the horizontal flight by the connector rotating with respect to the cabin and accordingly the rotors and fixed wings rotating around the cabin, and
　wherein the hinge is provided at a position forward of a center of gravity of the cabin.

2. The vertical takeoff and landing aircraft according to claim 1, wherein parts of the protectors function as the fixed wings.

3. The vertical takeoff and landing aircraft according to claim 1, wherein as the hinge, a damper hinge is used, the damper hinge providing a greater resistance against the rotation of the connector as an angular velocity of the connector with respect to the cabin is greater.

4. The vertical takeoff and landing aircraft according to claim 1, wherein the vertical takeoff and landing aircraft is configured to obtain a lift during the vertical takeoff and landing by the rotation of the rotors and obtain the lift during the horizontal flight by the fixed wings.

5. The vertical takeoff and landing aircraft according to claim 1, wherein the protectors are configured such that parts of each of the protectors being a lower side and an upper side during the horizontal flight function as the fixed wings.

6. The vertical takeoff and landing aircraft according to claim 1, wherein the hinge is provided at a position higher than the center of gravity of the cabin.

* * * * *